Aug. 15, 1939.　　　J. G. CAPSTAFF　　　2,169,758
SPRAY RACK
Filed May 28, 1938　　　2 Sheets-Sheet 1
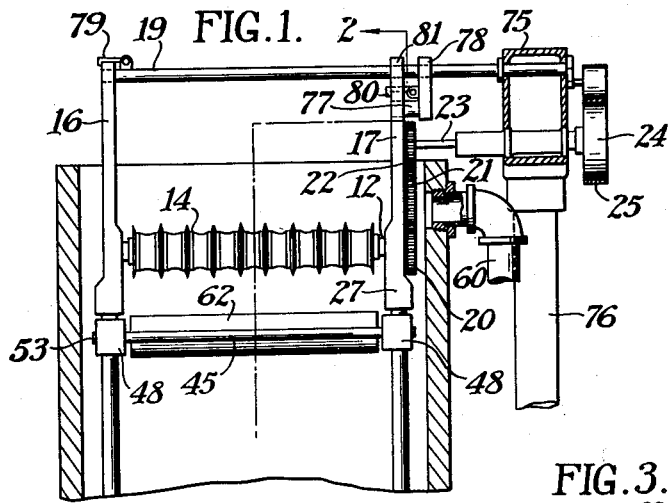
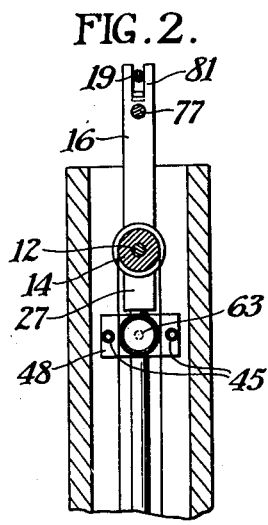
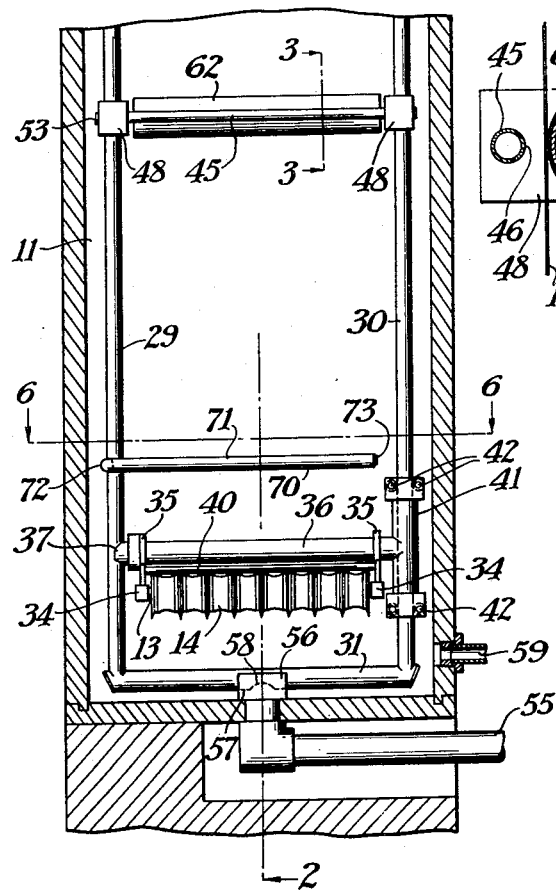
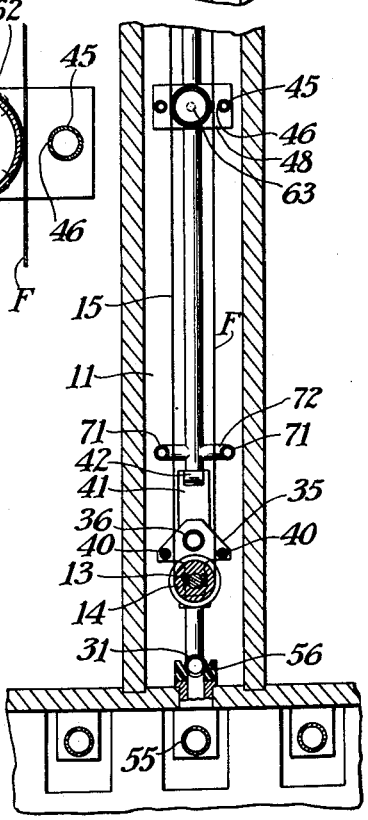
John G. Capstaff
INVENTOR
BY *Newton M. Perrins*
*J. Griffin Little*
ATTORNEYS Aug. 15, 1939.  J. G. CAPSTAFF  2,169,758
SPRAY RACK
Filed May 28, 1938   2 Sheets-Sheet 2
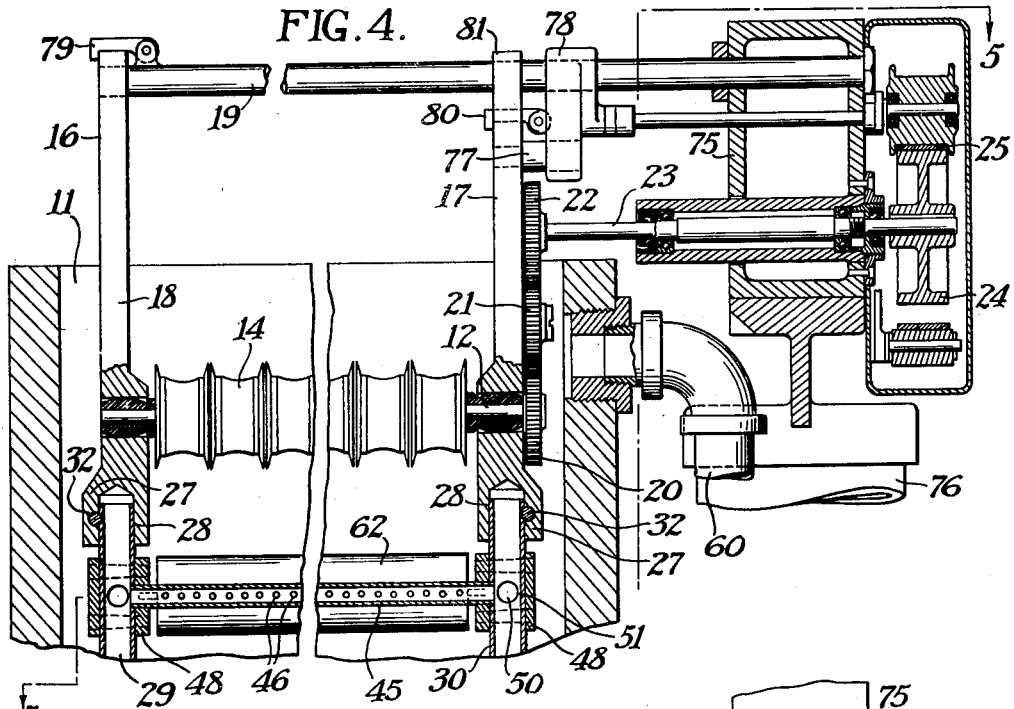
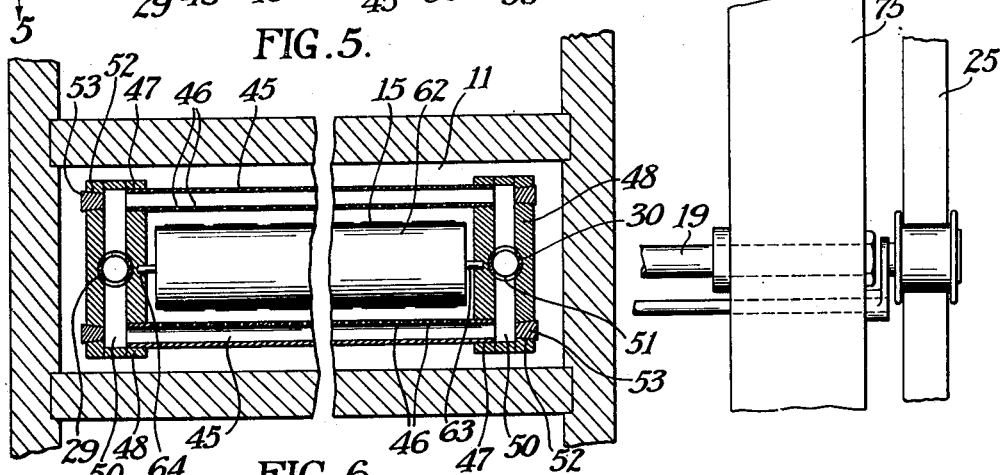
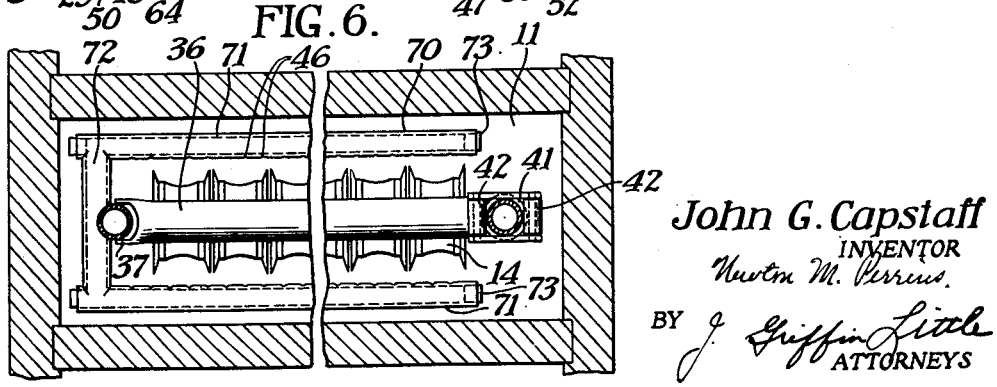
John G. Capstaff
INVENTOR Patented Aug. 15, 1939

2,169,758

UNITED STATES PATENT OFFICE 2,169,758

SPRAY RACK

John G. Capstaff, Rochester, N. Y., assignor to Eastman Kodak Company, Rochester, N. Y., a corporation of New Jersey Application May 28, 1938, Serial No. 210,672

17 Claims. (Cl. 95—94)

The present invention relates broadly to a film processing machine of the type shown and described in the applicant's copending application Number 196,020, filed March 15, 1938, to which reference may be had for a more complete discussion of the machine. More specifically, the invention pertains to a novel spray rack arrangement for such a machine.

One object of the invention is the provision of a spray rack arrangement which affords a unitary support for the spray pipes, the film backing rollers, the drive shaft, and the floating idler shaft.

Another object of the invention is the provision of a rack of this class which may be readily inserted in or removed from the fluid treating compartment.

A further object of the invention is the provision of a spray rack of the class described which, when positioned in the fluid compartment, is automatically connected to the fluid supply line, and when lifted from the compartment is automatically disconnected from the supply line.

A still further object of the invention is the provision of a spray rack construction which is detachably secured to the lifting mechanism.

Yet another object of the invention is the provision in such a rack construction of means for facilitating the cleaning and/or removal of the spray pipes.

And another object of the invention is the provision in such a spray rack construction of an arrangement which affords free unrestricted movement and/or adjustment of the floating idler shaft.

Still another object of the invention is the provision of such a spray rack construction which is relatively simple in construction, easy to assemble, and highly effective in use.

To these and other ends, the invention resides in certain improvements and combinations of parts, all as will be hereinafter more fully described, the novel features being pointed out in the claims at the end of the specification.

In the drawings:

Fig. 1 is a transverse vertical sectional view taken through a compartment in the wet section of the machine, showing the arrangement of a spray rack constructed in accordance with the present invention;

Fig. 2 is a vertical side elevation view taken substantially on the line 2—2 of Fig. 1, showing the arrangement of the various parts of the spray rack of the present invention;

Fig. 3 is a fragmentary sectional view taken substantially on the line 3—3 of Fig. 1, but on a larger scale than the latter, showing the arrangement of the spray pipes, the film backing rollers, and the supporting block therefor;

Fig. 4 is a transverse vertical sectional view of the upper portion of the spray rack, with parts in section, and on a larger scale than Fig. 1, showing the relation of the various parts;

Fig. 5 is a horizontal sectional view taken substantially on the line 5—5 of Fig. 4, showing the arrangement for supporting the film rollers and the upper spray pipes, and for connecting the latter to hollow fluid conducting members or conduits; and Fig. 6 is a horizontal sectional view taken substantially on the line 6—6 of Fig. 1, showing the arrangement of the bottom spray pipes, and the means for slidably supporting and guiding the lower floating idler shaft.

Similar reference numerals throughout the various views indicate the same parts.

In the processing of motion picture film, the latter is conveyed through the various liquid treating baths in which the film strip is developed, washed, fixed, or otherwise treated with various treating liquids or solutions. While the continuous development of motion picture film, by merely conveying the film strip through the treating solutions, has provided some very marked advantages, some disadvantages are also present, as is well known to those in the art. It has been found, however, that these disadvantages can be successfully overcome if fresh treating liquid is continuously supplied to the emulsion surface of the film strip.

To secure this result, the present invention provides a spray rack which is positioned within each of the liquid compartments, and is provided with spray pipes arranged adjacent the film loops. These spray pipes are connectible to a source of fresh treating solution and supply the latter in a continuous stream to the emulsion surface of the moving film strip. These jets or sprays also afford sufficient agitation of the treating liquid in the compartment adjacent the film strip, and thus effectively removes the various reaction products therefrom. In addition, the spray racks afford a support for the film backing rollers, as well as the film drive and idler shafts, as will be hereinafter more fully described. This unitary structure may be lifted out of the treating solution to permit threading the film strip over the various pulleys. When, however, the rack is thus elevated, the spray pipes are automatically disconnected from the liquid supply line, for obvious reasons. The spray rack is also preferably detachably connected to the lifting mechanism so the entire rack may be removed for repairs or may be replaced with a similar rack.

As clearly pointed out in the applicant's copending application, the wet section of the machine is divided into a series of wet compartments. However, as each of these compartments is identical in structure only one is shown in the present application, and is broadly designated by the numeral 11. Each of these compartments is arranged to hold a treating liquid which may be the same or different from the liquid in the adjacent compartment. Each of the compartments 11 has mounted therein a drive shaft 12, and a lower floating idler shaft 13. Both of these shafts are positioned below the level of the liquid in the compartment 11 so that the film strip is always immersed below the liquid level when in any particular compartment. Each of the shafts 12 and 13 has loosely mounted thereon a plurality of pulleys 14 over which the film strip F is arranged in helical loops 15.

The drive shaft 12 is journaled in spaced vertical members 16 and 17 of a frame, generally indicated by the numeral 18, and is supported in suspended relation by a supporting member 19, hereinafter more fully described. The right end of the drive shaft 12, see Fig. 4, is provided with a gear 20 which is connected by a gear 21 to a gear 22 secured to one end of a shaft 23 supported in a manner clearly shown in Fig. 4. The other end of the shaft 23 carries a flangeless pulley 24 over which a floating power-belt 25 is arranged to run to transmit power to the drive shaft 12. This driving mechanism for shaft 12 does not constitute a part of the present invention, and is fully disclosed and described in the above-mentioned copending application to which reference may be had for a complete discussion.

The lower ends of the members 16 and 17 are flared out as shown at 27, and are formed with recesses 28 adapted to receive the upper ends of tubular members 29 and 30 which extend downwardly along opposite sides of the compartment 11, see Figs. 1 and 4. The lower ends of the members 29 and 30 are connected by a similar tubular cross member 31 which cooperates with the vertical members 29 and 30 to provide a fluid conduit through which the treating liquid is supplied to the spray pipes to be later described. The upper ends of the members 29 and 30 are held in position in the recesses 28 by means of tapered pins 32, as clearly shown in Fig. 4. The frame 18 and the tubular members 29, 30, and 31 thus provide a spray rack which is suspended from and supported by the member 19 as clearly shown in Fig. 1.

The floating idler shaft 13 is supported in bearings 34 which are connected by brackets 35, of the shape best shown in Fig. 2, to a supporting member 36 the left end of which, see Fig. 1, is bifurcated as shown at 37, to engage the tubular member 29 which forms a guide for the left end of the member 36. The brackets 35 may be connected together and held in place by rods 40 which guide the film strip to hold the latter on the lower pulleys 14 in case the strip becomes slack because of a break. In normal operation, however, the film strip is spaced slightly from and does not contact the rods 40, as is apparent from an inspection of Fig. 2. The right end of the member 36, Fig. 1, is secured to a vertical guide member 41 which is slidably mounted on the tubular member 30. To facilitate free movement of the member 41, the upper and lower ends thereof are provided with small rollers 42 arranged to ride along the member 30. The members 29 and 30 thus afford tracks or guides for the floating shaft 13. It is apparent from an inspection of Fig. 2, however, that the shaft 13 is suspended in and supported entirely by the film loops 15. In order to provide sufficient tension in the loops, the lower shaft assembly may be suitably weighted.

A fresh supply of treating liquid is continuously supplied to the compartment 11 by means of spray pipes 45 arranged adjacent opposite runs of the film loops 15, as shown in Figs. 2, 3 and 5. These pipes are preferably arranged in pairs, as shown in Fig. 3, and have the ends thereof positioned in aligned openings 47 formed in blocks 48 carried by the opposite tubular members 29 and 30, as best shown in Fig. 5. Each of these blocks is made of any suitable material such, for example, as phenolized canvas, and is formed with an opening 50 which connects the pipe 45 to openings 51 found in the tubular members 29 and 30. It is thus apparent that the members 29, 30, and 31 may be utilized as a fluid conduit for supplying the treating liquid to the spray pipes 45. The blocks 48 are also preferably formed with opening 52, see Fig. 5, in alignment with the pipe 45 so that a brush or other cleaning medium may be inserted in the pipe 45 to clean the latter. Plugs 53 are provided for closing the openings 52.

A liquid supply line 55 extends through the bottom of the compartment 11, and is provided with a V-shaped portion 56 of resilient material, such as soft rubber, adapted to receive a portion 57 of the tubular member 31, as shown in Fig. 2. The portion 57 is provided with an aperture 58 which is arranged in alignment with the line 55 so that the latter may be brought into liquid communication with the member 31, and hence the members 29 and 30 and the spray pipes 45 when the parts are in a position shown in Figs. 1 and 2. The portion 56 thus affords a substantially liquid tight connection or coupling between the supply pipe 55 and the tubular member 31. The treating liquid is forced through the line 55 by a pump, not shown, the suction end of which is connected to a drawoff pipe 59 so that a constant circulation of the treating liquid is maintained within the compartment 11. An overflow pipe 60 is provided so as to maintain a constant level in the compartment 11. When the spray rack is elevated, as later described, the connection between the pipe 55 and the member 31 is broken so that the treating liquid is no longer supplied to the spray pipes 45, but is discharged directly into the compartment 11, the advantages of which are obvious.

The film strip F is preferably backed opposite the spray pipes 45, so as to support the strip F against the force of the jet, and to also prevent the chemicals and reaction products from flowing through the film perforations. In the present embodiment, this backing is secured by means of backing rollers 62 positioned within the film loops 15, as best shown in Fig. 3. Each of these rollers is carried on a shaft 63 rotatably mounted in the blocks 48, as shown in Figs. 1 and 5. To facilitate the ready insertion and removal of the backing rollers 62, the supporting block 48 at one end of each roller is provided with a slot 64, see Fig. 3. The rollers may then be inserted or removed in much the same manner as an ordinary window shade. These backing rollers 62 are of the same diameter as the pulleys 14, and are covered with a layer of "Canton" flannel to prevent scratching of the film strip.

With certain types of film, it may be necessary or desirable to vary the time in which the film strip remains in the various baths. This is particularly true in connection with critical baths such as the developing and fixing baths. Such a change may obviously be made by merely varying the position of the lower floating shaft assembly 13 so as to change the length of the loops 15. Any suitable means, not shown, may be utilized for thus shifting the position of the floating shaft assembly. However, in order to enable such adjustments to be made, the lower spray pipe arrangement, designated broadly by the numeral 70, Fig. 1, is somewhat different than the spray pipe arrangement previously described. This latter arrangement is illustrated in Fig. 6, and comprises a pair of cantilever spray pipes 71, similar to 45, connected to a cross pipe 72 which, in turn, is welded or otherwise secured to and in liquid communication with the tubular member 29, in a manner clearly shown in Fig. 6. Such a spray pipe construction enables the lower floating shaft assembly to be moved to the proper position to control the time of treatment in a particular bath. The ends of the pipes 71 are closed by plugs 73 which may be removed to permit cleaning of the pipes 71, as is apparent.

It is apparent from the above description, that the members 16 and 17, and the cooperating tubular members 29 and 30 and 31 provide a unitary rigid spray rack construction which is held in position in the compartment 11 by the member 19 and by reason of the engagement of the member 31 in the valve seat 56. This rack provides a mounting means for the drive and idler shafts, the spray pipes, and the backing rollers which are all movable as a unit with the rack. The member 19 extends through and is secured to a box girder 75 which, in turn, is secured to the top of a fluid hoist 76, of any well known construction, by which the member 19 and the spray rack assembly may be raised out of the compartment 11, to permit threading the film strip F over the pulleys 14. When in the elevated or raised position, the rack is supported and carried by the member 19. As the tubular member 31 has now been disconnected from the supply pipe 55, the latter discharges directly into the compartment 11 rather than through the spray pipes 45 and 71, the advantages of which are obvious. The above-described spray rack is preferably detachably secured to the member 19 so that the entire rack assembly may be removed for repairs or replacement.

To this end the member 19 extends through and supports the member 16, while the member 17 is supported on a short lug 77 projecting laterally from a bracket 78 which, in turn, is carried by the member 19, as clearly shown in Fig. 1. By means of this arrangement, a slight movement of the rack to the left, as viewed in Fig. 1, is sufficient to disengage the rack from the member 19 and the lug 77. A pivoted latch 79 on the member 19 and a similar latch 80 on the bracket 78 are arranged to engage the member 16 and 17 respectively, and hold the spray rack in position on the member 19, as is apparent from an inspection of Figs. 1 and 2. In order to reduce any tendency of the rack to sway when elevated, the upper end of the member 17 is bifurcated to provide narrow spaced fingers or prongs 81 between which the member 19 extends, as is shown in Fig. 2. Any tendency of the rack to sway will bring one of the prongs 81 into engagement with the member 19 to arrest such swaying.

It is thus apparent from the above description that the present invention provides a spray rack which affords a unitary support for the drive and idler shafts, spray pipes, and film backing rollers. It is also apparent that the rack may be easily and readily lifted out of the compartment to permit threading of the film strip, and the rack may be quickly detached to permit the replacement or repairs. The spray pipes may be also readily cleaned. When the rack is in its operative position within the compartment, the rack is automatically connected to the liquid supply line so the treating fluid may be supplied to the spray pipes. However, when the rack is elevated, the spray pipes are automatically and completely disconnected from the liquid supply line so that no liquid is discharged from the spray pipes while the rack is in the elevated position.

While one embodiment of the invention has been disclosed, it is to be understood that the inventive idea may be carried out in a number of ways. This application is, therefore, not to be limited to the precise details described, but is intended to cover all variations and modifications thereof falling within the spirit of the invention or the scope of the appended claims.

I claim:

1. In a film treating apparatus, the combination with a fluid treating compartment through which a film strip is arranged to be moved, of a rack having a tubular portion extending into said compartment, means for supplying a treating fluid to said portion, means carried by said rack for moving said strip through said compartment, and spray means carried by said portion adjacent said strip for spraying the treating fluid onto said strip as the latter is moved through said compartment.

2. In a film treating apparatus, the combination with a fluid treating compartment through which a film strip is arranged to be moved, of a rack having a tubular portion extending into said compartment, means for supplying a treating fluid to said portion, means carried by said rack for moving said strip through said compartment, spray means carried by said portion adjacent said strip for spraying the treating fluid onto said strip as the latter is moved through said compartment, lifting means positioned outside of said compartment, and means operatively connecting said rack to said lifting means so that said rack may be lifted out of said compartment.

3. In a film treating apparatus, the combination with a fluid treating compartment through which a film strip is arranged to be moved, of a rack having a tubular portion extending into said compartment, a treating fluid supply line connected to said compartment, means for connecting said portion in fluid communication with said line, means on said frame for moving said strip through said compartment, and spray means carried by said portion and positioned adjacent the moving strip for spraying the treating fluid thereon.

4. In a film treating apparatus, the combination with a fluid treating compartment through which a film strip is arranged to be moved, of a rack having a tubular portion extending into said compartment, means for supplying a treating fluid to said portion, a drive shaft mounted on said rack and positioned within said compartment for moving said strip therethrough, drive means for said shaft positioned outside of said compartment and operatively connected to said shaft, and spray means carried by said portion adjacent said strip for spraying the treating fluid onto said strip as the latter is moved through said compartment.

5. In a film treating apparatus, the combination with a fluid treating compartment through which a film strip is arranged to be moved, of a rack having a tubular portion extending into said compartment, a treating fluid supply line connected to said compartment, means for connecting said portion in fluid communication with said line, a drive shaft mounted on said rack and positioned within said compartment for moving said strip therethrough, drive means for said shaft positioned outside of said compartment and operatively connected to said shaft, and spray means carried by said portion adjacent said strip for spraying the treating fluid onto said strip as the latter is moved through said compartment.

6. In a film treating apparatus, the combination with a fluid treating compartment through which a film strip is arranged to be moved, of a rack having a tubular portion extending into said compartment, a treating fluid supply line connected to said compartment, means for connecting said portion in fluid communication with said line, a drive shaft mounted on said rack and positioned within said compartment for moving said strip therethrough, drive means for said shaft positioned outside of said compartment and operatively connected to said shaft, spray means carried by said portion adjacent said strip for spraying the treating fluid onto said strip as the latter is moved through said compartment, and means for lifting said rack from said compartment.

7. In a film treating apparatus, the combination with a fluid treating compartment through which a film strip is arranged to be moved, of a rack having a tubular portion extending into said compartment, a treating fluid supply line connected to said compartment, means for automatically connecting said portion to said supply line when said rack is positioned in said compartment, means on said frame for moving said strip through said compartment, spray means carried by said portion and positioned adjacent the moving strip for spraying the treating fluid thereon, means for lifting said rack from said compartment, and means for automatically disconnecting said portion from said line when said rack is lifted.

8. In a film treating apparatus, the combination with a fluid treating compartment through which a film strip is arranged to be moved, of a rack having a tubular portion extending into said compartment, a treating-fluid supply line having an open end portion extending into said compartment and adapted to receive a complementary section of said tubular portion to connect the latter in fluid communication with said supply line, a drive shaft mounted on said frame for propelling said strip through said compartment, and spray means carried by said portion and positioned adjacent the moving strip to spray the treating fluid thereon.

9. In a film treating apparatus, the combination with a fluid treating compartment through which a film strip is arranged to be moved, of a rack having a tubular portion extending into said compartment, a treating fluid supply line connected to said compartment, means for connecting said portion in fluid communication with said line, a drive shaft positioned at the top of said compartment and mounted on the upper end of said rack and arranged to move said strip through said compartment, an idler shaft positioned adjacent the bottom of said compartment and slidably mounted on the lower end of said rack, means for guiding said idler shaft on the lower end of said rack, said strip being arranged in loops over said shafts, spray means positioned within said loops and carried by and in fluid communication with said portion, and lifting means secured to the upper end of said rack for lifting the latter out of said compartment.

10. In a film treating apparatus, the combination with a fluid treating compartment through which a film strip is arranged to be moved, of a rack having a depending tubular portion extending downwardly into said compartment, a treating-liquid supply line extending into said compartment adjacent the bottom thereof, means for disengageably connecting the lower end of said portion in liquid communication with said line, means mounted on the upper end of said rack for moving said strip through said compartment, and spray pipes connected to and supported by said portion and extending across said compartment adjacent the moving strip, said pipes being formed with spaced openings for directing jets of treating liquid against said strip as the latter is moved through said compartment.

11. In a film treating apparatus, the combination with a fluid treating compartment through which a film strip is arranged to be moved, of a rack formed with a depending tubular portion extending downwardly along the side of said compartment, a treating liquid supply line extending into said compartment, means for connecting said portion in fluid communication with said supply line, means on said rack adjacent the top of said compartment for moving said strip through said compartment, said portion being formed with an opening therein, a block mounted on said portion and formed with a channel positioned in registry with said opening, and a spray pipe having one end positioned in said channel and extending across said compartment adjacent the moving film strip to direct the treating liquid against said strip.

12. In a film treating apparatus, the combination with a fluid treating compartment through which a film strip is arranged to be moved, of a rack formed with a depending tubular portion extending downwardly along the side of said compartment, a treating liquid supply line extending into said compartment, means for connecting said portion in fluid communication with said supply line, means on said rack adjacent the top of said compartment for moving said strip through said compartment, said portion being formed with an opening therein, a block mounted on said portion and formed with a channel positioned in registry with said opening, a spray pipe having one end positioned in said channel and extending across said compartment adjacent the moving strip to direct the treating liquid against said strip, and means connected to the upper end of said rack to lift the latter out of said compartment and to disconnect said portion from said supply line.

13. In a film treating apparatus, the combination with a fluid treating compartment through which a film strip is arranged to be moved, of a rack formed with a depending tubular portion extending downwardly along the side of said compartment, a treating liquid supply line extending into said compartment, means for connecting said portion in fluid communication with said supply line, means on said rack adjacent the top of said compartment for moving said strip through said compartment, a spray pipe extending across said compartment adjacent one face of said strip for directing a stream of treating liquid thereon, a backing roll for said strip positioned adjacent the other face thereof and arranged opposite said spray pipe, and a single means on said tubular portion for supporting both said roller and said spray pipe and for connecting the latter in liquid communication with said portion.

14. In a film treating apparatus, the combination with a fluid treating compartment through which a film strip is arranged to be moved, of a rack formed with a depending tubular portion extending downwardly along the side of said compartment, a treating liquid supply line extending into said compartment, means for connecting said portion in fluid communication with said supply line, means on said rack adjacent the top of said compartment for moving said strip through said compartment, a spray pipe extending across said compartment adjacent one face of said strip for directing a stream of treating liquid thereon, a backing roll for said strip positioned adjacent the other face thereof and arranged opposite said spray pipe, a single means on said tubular portion for supporting both said roller and said spray pipe and for connecting the latter in liquid communication with said portion, and means connected to the top of said rack for lifting the latter out of said compartment and for disconnecting said spray pipe from said supply line.

15. In a film treating apparatus, the combination with a liquid treating compartment through which a film strip is arranged to be moved, of a rack positioned within said compartment and formed with a depending U-shaped tubular fluid conduit extending downwardly along opposite sides and across the bottom of said compartment, a liquid supply line extending into said compartment and formed with an open end portion adapted to receive a part of said conduit, said part having an opening in registry with said open end to connect said conduit in fluid communication with said supply line, means on said rack for moving said strip through said compartment, spray pipes extending across said compartment adjacent one side of said strip to spray treating liquid thereon, backing rollers positioned on the other side of said strip opposite said spray pipes, and blocks mounted on the legs of said U-shaped member in alignment with and supporting said spray pipes and said roller, each of said blocks being formed with a channel adapted to receive the end of one of said pipes and to also register with an aperture formed in said conduit to connect the spray pipe thereto.

16. In a film treating apparatus, the combination with a liquid treating compartment through which a film strip is arranged to be moved, of a rack positioned within said compartment and formed with a depending U-shaped tubular fluid conduit extending downwardly along opposite sides and across the bottom of said compartment, a liquid supply line extending into said compartment and formed with an open end portion adapted to receive a part of said conduit, said part having an opening in registry with said open end to connect said conduit in fluid communication with said supply line, means on said rack for moving said strip through said compartment, spray pipes extending across said compartment adjacent one side of said strip to spray treating liquid thereon, backing rollers positioned on the other side of said strip opposite said spray pipes, blocks mounted on the legs of said U-shaped member in alignment with and supporting said spray pipes and said roller, each of said blocks being formed with a channel adapted to receive the end of one of said pipes and to also register with an aperture formed in said conduit to connect the spray pipe thereto, and means secured to the top of said rack to lift the latter out of said compartment and to disconnect said part from said open end so that said conduit will be moved out of fluid communication with said supply line when said rack is lifted.

17. In a film treating apparatus, the combination with a liquid treating compartment through which a film strip is arranged to be moved, a rack removably positioned in said compartment and formed with a depending liquid conduit having sections extending downwardly along opposite sides of said compartment, a liquid supply line extending into said compartment cooperating parts on said conduit and said supply line for connecting the latter in liquid communication with said conduit, a drive shaft mounted on said rack adjacent the top of said compartment for moving said strip therethrough, means for driving said shaft, a floating idler positioned adjacent the bottom of said compartment and slidably mounted on said conduit, said strip being arranged in loops over said shafts, spray pipes extending across said compartment on opposite sides of said loops to direct streams of treating liquid onto said strip as the latter is moved through said compartment by said drive shaft, backing rollers for said strip positioned within said loops and arranged opposite said spray pipes, pairs of blocks arranged on opposite sections of said conduit and arranged to receive and support opposite ends of said rollers and said spray pipes, each of said blocks being formed with an opening arranged in registry with an opening formed in said conduit and adapted to support one end of one of said spray pipes to connect the latter to said conduit, and means for simultaneously lifting said rack out of said compartment and for disconnecting said conduit from said supply pipe.

JOHN G. CAPSTAFF.